United States Patent

Erikson et al.

[11] Patent Number: 5,913,940
[45] Date of Patent: Jun. 22, 1999

[54] ADJUSTABLE PRELOAD ANTI-BACKLASH NUT

[75] Inventors: Keith W. Erikson, Hollis; Kenneth W. Erikson, Amherst, both of N.H.

[73] Assignee: Kerk Motion Products, Inc., Hollis, N.H.

[21] Appl. No.: 08/812,033

[22] Filed: Mar. 6, 1997

[51] Int. Cl.⁶ .............................. F16H 55/18; F16B 37/08
[52] U.S. Cl. ........................ 74/441; 74/424.8 A; 411/270
[58] Field of Search ............................. 74/424.8 A, 459, 74/441; 411/267, 270, 433

[56] References Cited

U.S. PATENT DOCUMENTS

| Re. 32,433 | 6/1987 | Erikson et al. . | |
|---|---|---|---|
| 2,294,745 | 9/1942 | Goetz | 74/424.8 A |
| 2,361,814 | 10/1944 | Berry | 411/935 |
| 3,831,460 | 8/1974 | Linley, Jr. . | |
| 4,002,083 | 1/1977 | Glicken . | |
| 4,210,033 | 7/1980 | Erikson et al. | 74/424.8 A |
| 4,249,426 | 2/1981 | Erikson et al. . | |
| 4,434,677 | 3/1984 | Linley, Jr. . | |
| 4,920,816 | 5/1990 | Inabe et al. | 74/424.8 A |
| 5,027,671 | 7/1991 | Erikson et al. | 74/424.8 A |
| 5,252,015 | 10/1993 | Davs | 411/433 X |
| 5,522,770 | 6/1996 | Sugiki et al. | 464/87 |

FOREIGN PATENT DOCUMENTS

| 924.778 | 8/1947 | France . | |
|---|---|---|---|
| 2061408 | 6/1972 | Germany | 74/424.8 R |
| 41 26 621 | 4/1993 | Germany . | |

*Primary Examiner*—John A. Jeffery
*Assistant Examiner*—William C. Joyce
*Attorney, Agent, or Firm*—Hamilton, Brook, Smith & Reynolds, P.C.

[57] ABSTRACT

An anti-backlash nut designed to translate along a lead screw in two longitudinal directions is disclosed. The nut has one or more longitudinal flexure members each having one end fixed to the nut and the other one free floating. Internal threads are formed at the free floating ends of the flexure members complementary to the threads of the screw. Incline ramps are located on the exterior of the free floating ends. A flexible compression member in the form of an O-ring surrounds the ramps for continuously urging the threads at the free floating end into forceful engagement with the threads of the screw. There is an adjustable sleeve for urging the O-ring against the ramps with variable force to increase and decrease the force with which the threads of the flexure members engage the threads of the screw.

9 Claims, 2 Drawing Sheets

ADJUSTABLE PRELOAD ANTI-BACKLASH NUT

BACKGROUND OF THE INVENTION

This invention relates to anti-backlash nuts in general and, more specifically, to an adjustable pre-load nut of the anti-backlash type disclosed by us in U.S. Pat. No. 4,249,426 which was reissued as RE 32,433 on Jun. 9, 1987.

Our above-identified patent discloses an anti-backlash nut which is designed to translate back and forth along a screw in opposite directions. The screw has external threads and is driven by a reversible motor. The nut, per se, comprises a nut body portion having internal threads complementary to the external threads on the screw. The body portion has means for attaching it to a load which is supported and reciprocated by the nut. The nut includes a plurality of longitudinal flexure members cantilevered to the body portion at one end and terminating at a free floating end. The flexure members extended parallel to one another and to the axis of rotation of the screw and include internal threads complementary to the threads of the screw. The screw threads are helical as are the threads of the nut.

On the free floating end of each flexure member is a ramp extending radially outwardly in a direction away from the fixed or cantilevered end of the flexure members. The ramps are surrounded by an annular pressure applying ring which is continuously forced away from the nut body upwardly along the ramps by a compression spring. The force against the ramps cause inwardly extending force vectors to constantly press the threads of the flexure members against the threads of the screw as the nut translates back and forth lengthwise along the screw.

This construction results in a substantially constant load and constant torque sufficient to drive the nut and the load that the nut normally carries under normal working conditions.

There are variations in the torque required to drive the nut along the screw and frequently adjustments to that torque are desirable. These variations can result from carriage drag, indeterminate bearing efficiencies and drag caused by the rails on which the nut translates, etc. These variations can be compensated by changing the size and strength of the spring. This necessitates removing the nut from the lead screw and replacing the spring, all of which is time-consuming and inefficient.

It is one object of the present invention to be able to vary the torque application without removing the nut or the spring.

Another object of this invention is to vary the torque by merely adjusting the nut.

The force with which the external threads of the flexible members engage the threads of the screw is maintained constant even though the threads wear over a period of time. This counteracts backlash and is because the pressure applying ring is at all times urged by the spring toward the large end of the ramps and will literally move in that direction at a very small rate over a lengthy period of time of operation.

Yet another object of this invention to be able to vary the torque either independently of backlash compensation or in combination with backlash compensation. These objects and other features of the invention will become apparent with reference to the accompanying specification and drawings.

SUMMARY OF THE INVENTION

The invention resides in an adjustable pre-load nut having anti-backlash features which is designed to translate along a screw either horizontally or vertically. The nut, in turn, carries a load. The screw has helical external threads and the nut comprises a body having internal threads complementary to the external threads of the screw. There are one or more longitudinal flexure members each having one end cantilevered to the nut body and one end free floating. Internal threads are formed at the free floating ends of the longitudinal flexure members complementary to the threads of the screw. On the exterior of the free floating ends of the flexure members are ramps extending radially outwardly in the direction away from the fixed or cantilevered ends. In one embodiment of the invention, there is a flexible compression member surrounding the ramps for continuously urging the threads at the free floating ends of the flexure members into forcible engagement with the threads on the screw. The continuous force provided by the compression member is due to its inherent compliance.

More specifically, the compression member may be a high friction, elastomeric O-ring engageable with and surrounding the ramps to urge the threads at the free floating ends of the flexure members into continuous engagement with the threads of the screw to continuously take up wear between the threads and, hence, counteract backlash.

In one embodiment of the invention, there is a cylindrical column surrounding the flexure members for transmitting force to the ramps. The cylindrical column is adjustable toward and away from the ramps to vary the force applied to the ramps and, hence, to the threads on the flexure members engaging the threads on the screw to vary the torque.

The cylindrical column is internally threaded and is in engagement with threads projecting from the nut body whereby rotation of the column causes it to translate toward and away from the nut body in a direction parallel to the axis of the screw.

In another embodiment, the cylindrical column may comprise a single cylinder threaded at one end and engagable with the ramps on the other.

In yet another embodiment, the column is split intermediate its ends such that only one of the two portions is rotatable. In the latter instance, an O-ring may be held in engagement with the ramps by the outermost portion of the column. The O-ring is made of a high-friction elastomer such that it does not rotate relative to the ramps when it engages them. The threaded portion of the column is rotatable to extend the non-rotating O-ring against the ramps to apply greater torque and away from the ramps to lessen the torque.

The above and other features of the invention including various and novel details of construction and combination of parts will now be more particularly described with reference to the accompanying drawings and pointed out in the claims. It will be understood that the particular adjustable preload anti-backlash nut embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
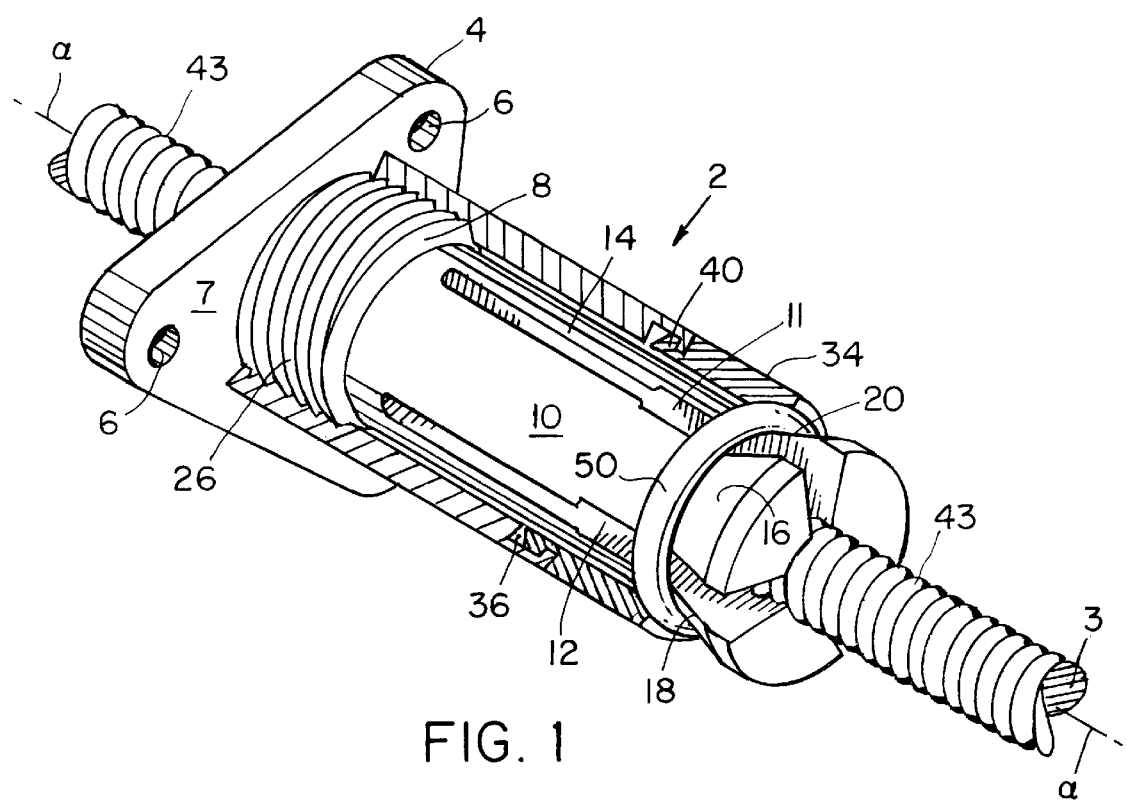
FIG. 1 is perspective view, partially broken away, illustrating an adjustable pre-load nut having anti-backlash features embodying the present invention.

Referring to FIG. 1, the nut is generally designated 2 and has a face plate 4 which includes circular attachment holes 6 (FIG. 1) so it can be attached, such as by bolts, to an element to be driven (i.e., the load). Face plate 4 need not necessarily be the shape shown in FIG. 1 but any configuration best suited for attachment to the load. The nut 2 has a circular hub portion 8 projecting from a flat surface 7 on the face plate 4.

The nut 2 is hollow and has internal helical threads within the hub 8 and the plate 4. Its threads are engagable with mating external threads 43 on a lead screw 3 which is rotatable about an axis α in opposite directions. Rotation of the lead screw in either a clockwise or counterclockwise direction causes the nut 2 to translate without rotation lengthwise of the lead screw 3. When the face plate is attached to a load, it causes the load to reciprocate relative to the axis α of the screw. The load frequently moves along rails parallel to the lead screw 3.

A plurality of longitudinal flexure members or fingers 10, 12 and 14 separated from each other by gaps 11 are cantilevered on and extend outwardly from the hub portion 8. The face plate 4, the hub portion 8 and the flexure members 10, 12 and 14 are preferably integral, although they may be separate and secured together as a unit. The flexure members 10, 12 and 14 respectively have ramps 16, 18 and 20 on their free floating end extending radially outwardly in a direction away from the cantilevered ends. They are internally threaded to engage the threads 43 on the lead screw 3. As thus far described, the anti-backlash nut 2 is similar to that disclosed in our reissue patent RE 32,433.

Figure 2:
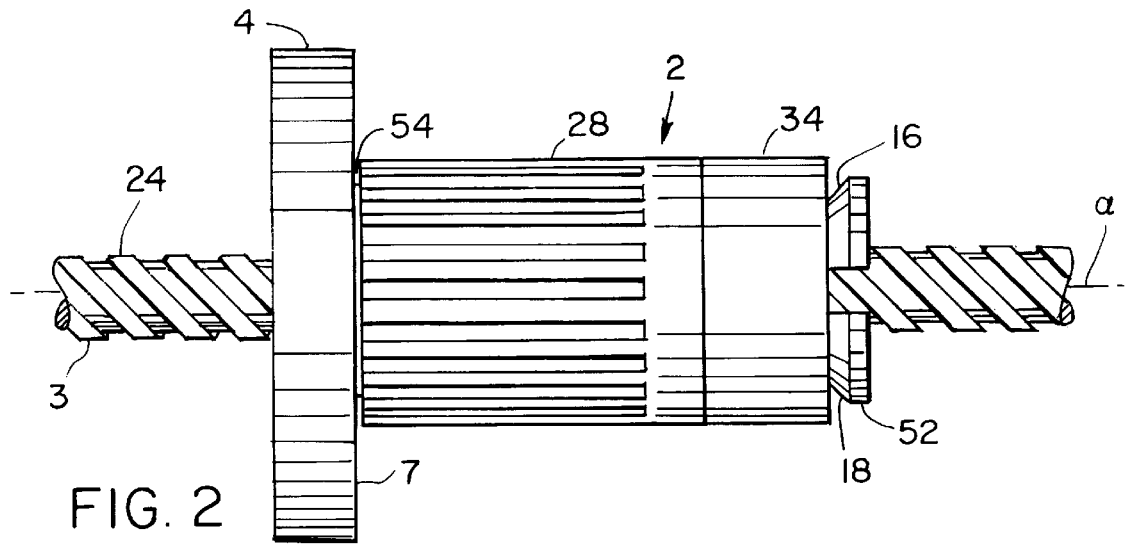
FIG. 2 is a side elevation of the pre-load nut shown in FIG. 1.

The hub portion 8 is formed with threads 26 on its exterior. A splined cylindrical column or adjusting collar 28 (FIG. 2) has interior threads 30 (FIGS. 3 and 4) rotatably engagable with the threads 26 on the hub 8 such that rotation of the collar 28 causes it to move toward and away from the surface 7 of the face plate 4 as illustrated by the gap 54 (FIGS. 2 and 3).

A force applying, cylindrical column or collar 34 is notably attached to the collar 28. The collar 28 has an annular groove 36 formed in its interior circular surface 38. An annular projection 40 on the force-applying collar 34 is formed with a tapered surface 42. The projection engages within the annular groove 36 when snapped together. The collar 34 will rotate relative to the collar 28.

An annular groove 46 is located at the free or distal end 44 of the force-applying collar 34 and is formed to receive a relatively high-friction elastomeric O-ring 50. The diameter of the O-ring 50, when assembled in the force-applying collar 34, is slightly less that the diameter 52 of the longitudinal flexure members 10, 12 and 14 at the outer edge of the ramps such that the elastomeric O-ring is engagable with each of the ramps.

Figure 3:
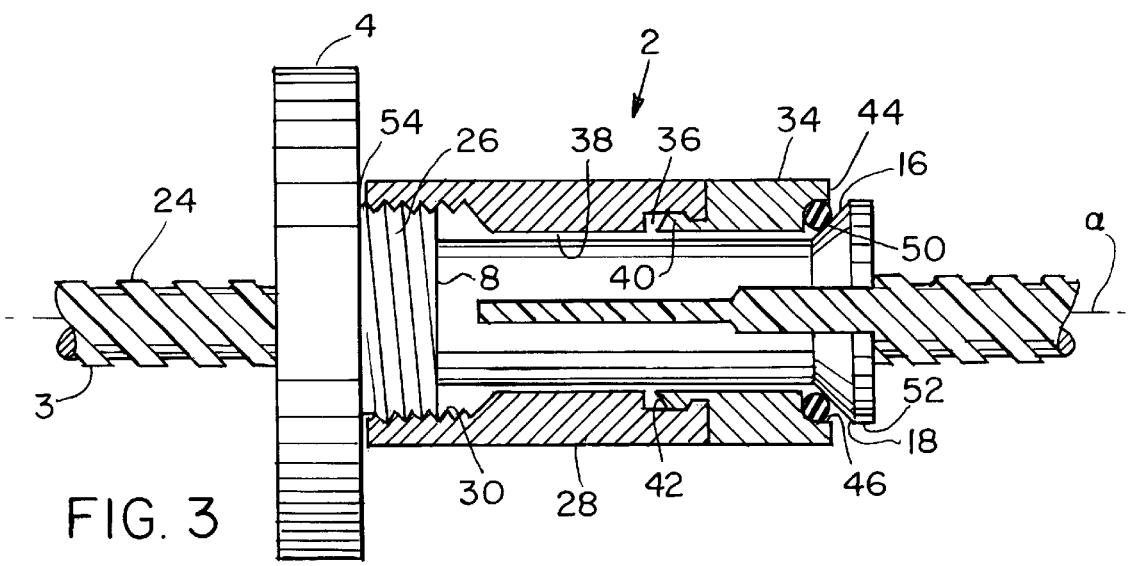
FIG. 3 is a sectional view of the pre-load nut in one position of adjustment.
Figure 4:
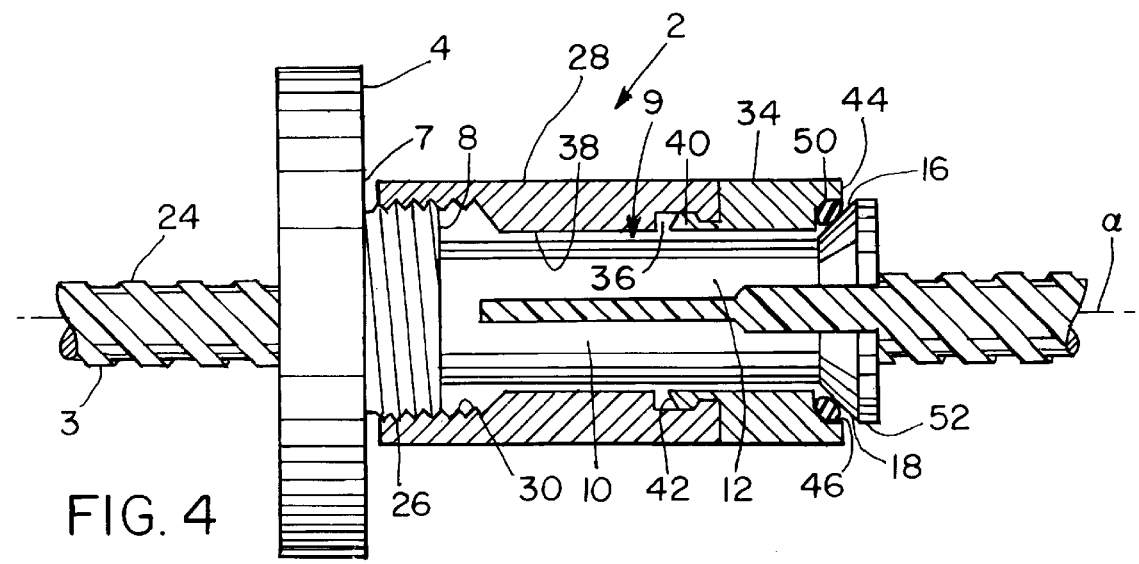
FIG. 4 is a sectional view of the pre-load nut in a second position of adjustment.

With the nut 2 assembled as shown in FIG. 3, to increase the torque between the nut 2 and the rotatable threaded lead screw 3 or to increase the preload force of the nut upon the lead screw, it is merely necessary to rotate the splined adjusting sleeve 28 which results in increasing the gap 54 between the sleeve and the surface 7 on the face plate 4. This causes the O-ring 50 to be compressed from the FIG. 3 position to the FIG. 4 position whereupon it assumes an oval cross-section. This increases the force on the ramps 16, 18 and 20 and, thus, the pressure between the internal threads on the flexure members and the threads 24 on the lead screw. Conversely, rotating the sleeve 28 in the opposite direction decreases the pressure.

As stated above, this new construction serves two functions, (a) to increase and decrease the pressure between the threads in the fingers and those on the lead screw to increase torque or the pre-load on the nut, and (b) the O-ring itself, when in any degree of compressed condition, because of its inherent compliance, applies a continuous pressure on the ramps to urge the threads constantly into engagement with the threads on the lead screw to compensate for backlash.

If desired, the adjusting sleeve 28 and the pressure applying sleeve 34 could be integral. In this instance, the high friction O-ring would not have to be used with merely the free end 44 of the pressure applying sleeve bearing directly against the ramps. With this construction, when the sleeve is rotated increasing the gap 54, pressure is applied directly to the ramps by the sleeve and relative torque is increased.

In this instance, with no O-ring, there is no inherent compliance to continuously urge the internal threads against the external threads of the lead screw, hence, no feature to continuously counter the backlash. The backlash, however, is countered initially by the initial pressure of the end 44 of the sleeve 34 against the ramps. However, it will not be continuous but will decrease with wear between the threads. Further rotation of the sleeve is needed to increase torque and counter backlash.

It is also theoretically possible to make the sleeves 28 and 34 integral and use the O-ring 50 but, in this case, the O-ring would be made of material having lower friction as it would have to rotate slightly against the ramps.

With the constriction illustrated in FIGS. 2 and 3, the O-ring 50 does not rotate nor does the pressure applying ring or sleeve 34. Relative rotation takes place only between the sleeve 28, which is manually rotated and sleeve 34, which does not.

We claim:

1. An anti-backlash nut designed to move along a screw having external threads thereon in either of two longitudinal directions, said nut comprising a nut body having an internal thread complementary to the external thread on a screw;
   at least one longitudinal flexure member having one end fixed to said nut body and one end free-floating;
   internal threads at the free-floating end of said longitudinal flexure member complementary to the threads of a screw;
   an inclined ramp on an exterior of said free-floating end extending radially outwardly and inclined in a direction away from the fixed end; and
   an elastomeric compression member surrounding and engaged with the ramp for continuously urging the threads at the free-floating end of the flexure members into forcible engagement with the threads on a screw.

2. The anti-backlash nut of claim 1, wherein the elastomeric compression member is an elastomeric O-ring.

3. An anti-backlash nut designed to move along a screw having external threads thereon in either of two longitudinal directions, said nut comprising a nut body having an internal thread complementary to the external thread on a screw;
   at least one longitudinal flexure member having one end fixed to said nut body and one end free-floating;
   internal threads at the free-floating end of said longitudinal flexure member complementary to the threads of a screw;

an inclined ramp on an exterior of said free-floating end extending radially outwardly and inclined in a direction away from the fixed end; and an elastomeric O-ring engaging with and surrounding the ramp for continuously urging the threads at the free-floating end of the flexure member into engagement with the threads of a screw to continuously take up clearance between the threads and reduce backlash.

4. The anti-backlash nut of claim 3, wherein there are adjusting members for urging the O-ring against the ramp with variable force to increase and decrease the force with which the threads of the flexure member engage the threads of a screw.

5. An anti-backlash nut designed to move along a screw having external threads thereon in either of two longitudinal directions, said nut comprising nut body having an internal thread complementary to the external thread on a screw;

at least one longitudinal flexure member having one end fixed to said nut body and one end free-floating;

internal threads at the free-floating end of said longitudinal flexure member complementary to the threads of a screw;

an inclined ramp on an exterior of said free-floating end extending radially outwardly and inclined in a direction away from the fixed end;

an elastomeric compression member surrounding and engaging the ramp for continuously urging the threads at the free-floating end of the flexure member into forcible engagement with the threads on a screw; and an adjusting member for urging the compression member against the ramp with variable force to increase and decrease the force with which the threads of the flexure member engage the threads of a screw.

6. An anti-backlash nut designed to move along a screw having external threads thereon in either of two longitudinal directions, said nut comprising a nut body having an internal thread complementary to the external thread on a screw;

at least one longitudinal flexure member having one end fixed to said nut body and one end free-floating;

internal threads at the free-floating end of said longitudinal flexure member complementary to the threads of a screw;

an inclined ramp on an exterior of said free-floating end extending radially outwardly and inclined in a direction away from the fixed end; and a cylindrical column having an elastomeric compression member surrounding and engaged with the ramp for transmitting force to the flexure member.

7. The anti-backlash nut of claim 6, wherein there is an adjusting member for urging the column toward and away from the ramp.

8. The anti-backlash nut of claim 7, wherein the adjusting member is an internally threaded collar engageable with external threads projecting from the nut body.

9. The anti-backlash nut of claim 6 wherein the elastomeric compression member is an elastomeric O-ring retained by the cylindrical column, the O-ring engaging with and surrounding the ramps for continuously urging the threads at the free floating ends of the flexure members into engagement with the threads of a screw to continuously take up the clearance between the threads and reduce backlash and vary the torque between the nut and a screw.

\* \* \* \* \*